United States Patent [19]
Spiegelman et al.

[11] Patent Number: 6,089,282
[45] Date of Patent: Jul. 18, 2000

[54] METHOD FOR RECOVERY AND REUSE OF GAS

[75] Inventors: Jeffrey J. Spiegelman, La Jolla; Peter K. Shogren, San Diego, both of Calif.

[73] Assignee: Aeronex, Inc., San Diego, Calif.

[21] Appl. No.: 09/074,989

[22] Filed: May 8, 1998

[51] Int. Cl.[7] .......................... B65B 31/02; B65B 31/04; C01B 23/00

[52] U.S. Cl. ................ 141/8; 141/66; 423/262; 313/576; 137/256

[58] Field of Search .............. 423/262; 141/65, 141/66, 7, 8; 313/576, 643; 95/117; 137/256

[56] References Cited

U.S. PATENT DOCUMENTS

| | | | |
|---|---|---|---|
| 1,591,932 | 1/1926 | Young | 141/66 |
| 3,455,348 | 7/1969 | Stingele et al. | 141/65 |
| 4,344,467 | 8/1982 | Lahde | 141/66 |
| 4,661,963 | 4/1987 | Liu et al. | |
| 5,676,736 | 10/1997 | Crozel | 95/45 |

FOREIGN PATENT DOCUMENTS 0826629   3/1998   European Pat. Off.

*Primary Examiner*—Steven P. Griffin
*Assistant Examiner*—Elin A Warn
*Attorney, Agent, or Firm*—Brown Martin Haller & McClain

[57] ABSTRACT

A gas recovery and reuse/recycle method is disclosed which can readily and economically recover valuable and/or environmentally hazardous gases from a manufacturing or chemical process and then return the gas to the process for reuse, and repeat this many times without significant contamination or degradation of the gas or the produced products. All gas transport, compression and storage equipment is designed and maintained so that it is non-contaminating to the process gas. Commonly the process gas will be a Group VIII gas, preferably He, Ne, Kr or Xe, or a gas which comprises a hazard to the ambient environment or beings therein, such as a carbon oxide gas, a halocarbon gas, an acid-precursor gas, a biologically hazardous gas, or a radioactive gas.

18 Claims, 1 Drawing Sheet

METHOD FOR RECOVERY AND REUSE OF GAS

BACKGROUND OF THE INVENTION

1. Field of the Invention

The invention herein relates to operation of manufacturing processes and equipment in which a valuable or environmentally hazardous gas is utilized. More particularly, it relates to methods for recovery from and subsequent reuse of that gas in such processes and equipment.

2. Description of the Prior Art

There are numerous manufacturing processes in which gases are used as reactants or to provide a process atmosphere, but in which a significant amount of free excess gas remains upon completion of the process. If the gas is both inexpensive and non-hazardous to the environment, the excess gas can simply be vented to the ambient environment. Typical examples of such gases are air, oxygen, nitrogen, water vapor and, in some cases, argon.

In many other processes, however, the gas that is present in the process, either as initially supplied to the process vessel or chamber or as generated during the process, is an expensive gas, a gas in limited supply or a gas which poses some type of environmental hazard, including hazards to humans and animals. The manufacture of xenon-filled light bulbs represents a typical example of such a process. The light bulb components are first assembled under ordinary ambient conditions of the manufacturing facility (i.e., in air) with a small opening left in the glass envelope. The assembled bulbs are then placed in a gas-tight, high-temperature-capable chamber. The chamber is sealed and all of the air is evacuated, following which the chamber is filled with xenon gas. Some of the xenon gas fills the interior of the glass envelope of each bulb, and subsequent heating of the chamber causes the opening in the glass envelope to become sealed, trapping the xenon gas filler within the envelope of the bulb. The chamber and bulbs are then allowed to cool, so that the bulbs are ready for retrieval. There is, however, a large excess of xenon gas remaining in the chamber over that which is now sequestered by being sealed in the light bulbs. While the venting of xenon does not pose an environmental hazard, xenon is a rare and quite expensive gas and any quantity of xenon vented to the atmosphere is thereafter unrecoverable. Venting, therefore, represents a substantial loss of a valuable and costly resource, xenon gas, so the bulb manufacturers want to recover as much of the excess xenon as possible after each batch of bulbs is manufactured and recycle it for reuse in the manufacture of subsequent batches of light bulbs.

A few processes have been described in the prior art for recovery of xenon and similar gases. Such processes have commonly involved cryogenic steps, are quite complex and expensive to operate and the gas recovery is often relatively low. Consequently, such processes have generally been used only when the product being manufactured is of sufficiently high value that the cost of such gas recovery can be justified as part of the overall manufacturing cost. For relatively low cost items such as light bulbs, of course, such costs cannot be justified and the xenon gas has, in the past, usually been vented and lost.

Another type of gas recovery process has been described in European Patent Application 0 826 629 A2. In this process xenon, neon, krypton or mixtures thereof is said to be recovered from a process chamber by mixing with a purge gas such as hydrogen, steam (water vapor), carbon monoxide or dioxide, oxygen or a gaseous $C_2$–$C_6$ hydrocarbon, followed by separation of the process gas and the purge gas. Such a process requires extensive gas separation facilities, such as membrane and zeolite separators, and leaves the process gas with residual purge gas contamination. Purge gases such as steam and the hydrocarbons can also condense on the interior surfaces of system piping, valves, pumps, etc., attacking and corroding metals, seals and other system components.

There have been attempts in the past to recover xenon gas from light bulb manufacturing and similar manufacturing processes by pumping the gas to storage and then pumping it back to the reaction chamber for subsequent reuse. However, such processes have proved to be unsatisfactory beyond very short time periods (i.e., over more than a few iterations of the manufacturing process), since the gas quickly becomes contaminated with foreign material during the repeated pumping cycles. This in turn causes deterioration of the successive batches of the manufactured products as the increasingly contaminated gas is repeatedly recycled back to subsequent runs of the manufacturing process.

In those processes where the gas being used or generated is one which is environmentally hazardous, venting of the gas following the manufacturing process is unacceptable and often illegal. In the past, one practice has been to remove the gas from the chamber and pass it to a reaction or neutralization process where the gas is chemically converted to environmentally acceptable materials or is sealed in tanks, cylinders and the like for storage and prevention of escape to the atmosphere. Where reuse of the gas has been contemplated, problems similar to those with xenon have been encountered, in that the gases have become contaminated with moisture or foreign materials to the extent that repeated recycling of the gases has resulted in progressive degradation of the products being manufactured.

Other processes have been used for recovery of some types of hazardous gases, such as scrubbing for acid-precursor gases such as the sulfur oxides. However, in addition to being expensive, such processes usually covert the gases into a different physical form or chemical composition, and therefore prevent the gas from being recycled and reused.

SUMMARY OF THE INVENTION

We have now invented a method which can readily and economically recover valuable and/or environmentally hazardous gases from a manufacturing operation, maintain the removed gas in an environmentally secure vessel while the manufacturing operation equipment is readied for another batch in the manufacturing cycle, and then return the stored gas to the manufacturing chamber for reuse in the process. This method enables the recovery/reuse cycle to be repeated many times without significant contamination or degradation of the gas or of the produced products.

The present process is also non-cryogenic. As noted above, cryogenic processes are cumbersome, complex, expensive and of low yield. In contrast, this process provides for substantially complete (i.e., >90%, and usually >99%) gas recovery, without the complex equipment, extensive insulation and difficult operating conditions of the prior art cryogenic systems.

A critical factor in this invention is the requirement that all gas transport, compression and storage equipment must be designed and maintained so that it is non-contaminating to the gas, so that no moisture, gas, vapor, particulate or other foreign matter, whether organic or inorganic, comes into contact with the gas while the latter is being moved or stored outside the manufacturing chamber. This invention also includes the recognition that conventional equipment, such as pumps and compressors, which put components which include volatile materials, such as lubricants and sealants, into contact with the gas, are unacceptable. Components such as lubricants, sealants and the like emit minute quantities of volatile materials, which even though emitted only slowly, soon build up to significant quantities in the gas flow stream and render the gases contaminated and unusable. Further, the build up of the contaminants in the gas stream invariably leads to deterioration of the products which are manufactured with the contaminated gas, such that not only is the gas wasted, but product rejection rates are high. In the present invention, however, the requirement of use of non-contaminating equipment, i.e. equipment which does not place any volatile or transferable gas, liquid or particulate matter in contact with the process gas stream, is a critical component. This factor, the criticality of which has not heretofore been recognized, results in the unique presently claimed process which permits manufacturing processes to use recovered and recycled gases for desirably long periods of time without deterioration of the gases or of the products which they are being used to manufacture.

In summary, therefore, the present invention is of a method for the recovery of process gas from a chamber and recirculation of the gas to the chamber which comprises withdrawing substantially all of the process gas from the chamber through a non-contaminating vacuum pump; passing the process gas to a storage vessel prior to or following compression of the process gas through a non-contaminating compressor; relieving the vacuum created in the by withdrawal of the process gas by insertion of a purge gas into the chamber, such that access may be had to the chamber; evacuating the chamber by withdrawal of the purge gas; recovering the process gas from the storage vessel and if uncompressed, compressing the process gas; and returning the compressed process gas to the evacuated chamber; such that the returned process gas may be reused therein.

In a broad embodiment, the invention is of a method for the recovery of process gas from a chamber after a first operation in the chamber involving the presence or use of the gas, and recirculation of the gas to the chamber for use in a subsequent operation involving the presence or use of the gas, which comprises withdrawing substantially all of the process gas from the chamber through a non-contaminating vacuum pump following completion of the first operation; passing the process gas to a storage vessel prior to or following compression of the process gas through a non-contaminating compressor; relieving the vacuum created in the chamber by withdrawal of the process gas by insertion of a purge gas into the chamber, such that access may be had to the chamber; evacuating the chamber by withdrawal of the purge gas; recovering the process gas from the storage vessel and if uncompressed, compressing the process gas; and returning the compressed process gas to the evacuated chamber; such that the returned process gas may be reused therein in the subsequent operation.

In the invention, the process gas may be a Group VIII gas, preferably He, Ne, Kr or Xe, or a gas which comprises a hazard to the ambient environment or beings therein, such as a carbon oxide gas, a halocarbon gas, an acid-precursor gas, a biologically hazardous gas, or a radioactive gas, or any other gas which it is desired to recover and reuse in an uncontaminated state.

DETAILED DESCRIPTION AND PREFERRED EMBODIMENTS

Figure 1:
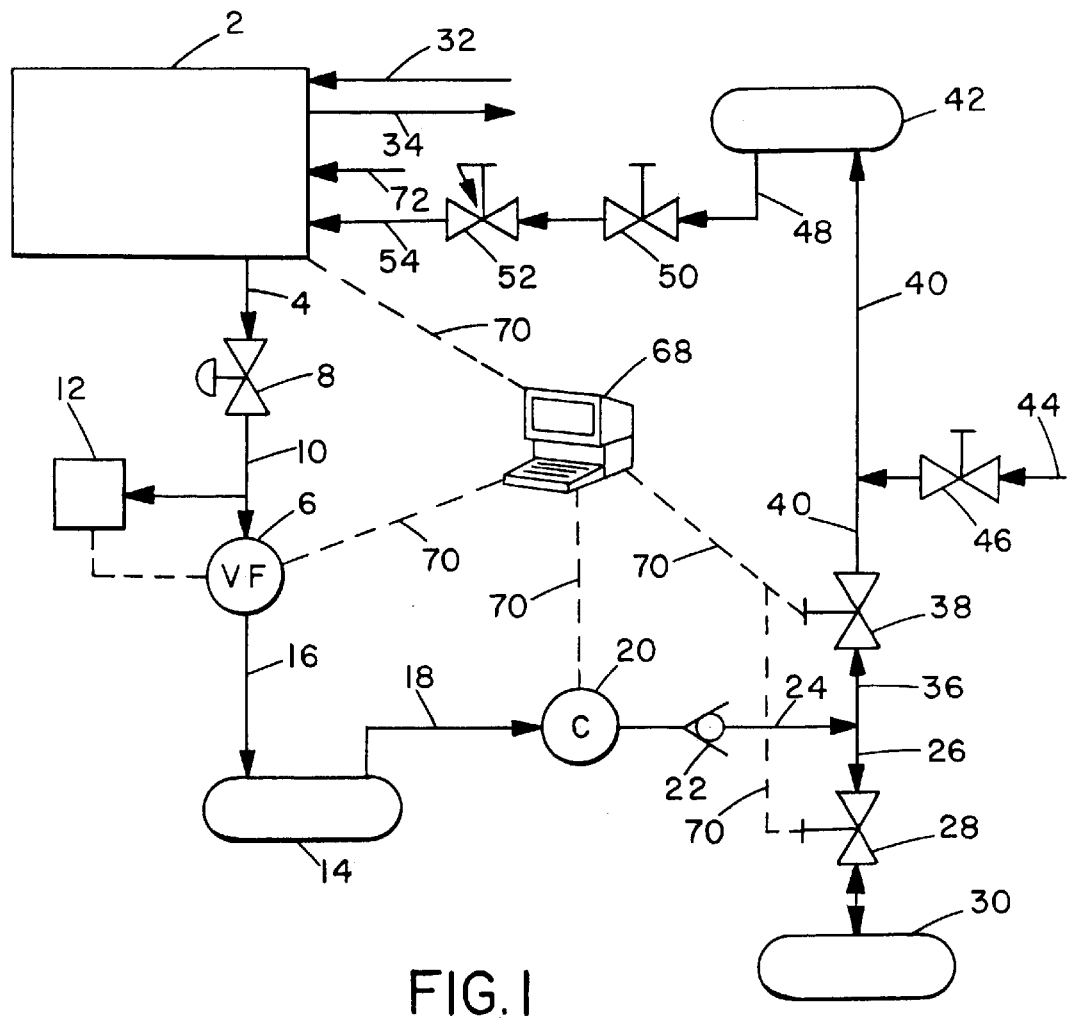
FIG. 1 is a schematic flow diagram illustrating one embodiment of the method of this invention.

The methods of this invention will be best understood by reference to the drawings, which illustrate schematically two preferred alternative embodiments of the invention. Considering first the embodiment of FIG. 1, an openable gas-tight manufacturing or reaction chamber, such as the chamber used to fill and heat seal light bulbs as described above, is illustrated at 2. The nature of this chamber or the manufacturing or reaction operation performed in it is not critical to the present invention, other than for the fact that it involves the presence or use of the gas, and at its conclusion there will be a significant amount of excess gas which must be recovered from the chamber 2. The exact amount of gas to be recovered is similarly not critical, although in many cases the excess gas to be removed represents a larger quantity (in many cases a much larger quantity) of gas than the quantity of gas actually utilized and consumed or sequestered in the operation. In the exemplary manufacturer of xenon-filled light bulbs, for instance, the excess xenon remaining after the bulbs have been filled and sealed normally amounts to 90% or more of the quantity of xenon gas initially injected into the chamber 2.

Additional examples of the types of operations which may be performed in the chamber 2 and which result in excess recoverable gas are the production of flat panel displays for television and computers and those processes using Freon™ chlorofluorocarbon gases. Those skilled in the art will be aware of numerous other operations and processes in which valuable and/or environmentally hazardous gases are involved or used and in which there is a chamber which would be the equivalent of chamber 2. (For brevity herein, the invention will be exemplified below in terms of the process for the manufacture of xenon-filled light bulbs described above, and the subsequent reuse and recovery of the xenon gas. As will be further discussed, however, it will be recognized that the invention herein is not limited to recovery and recycle of xenon.)

When the light bulb sealing step in chamber 2 is completed with the excess xenon present, the chamber is cooled and otherwise made ready to be unsealed for recovery of the resulting light bulbs. Of course, immediate unsealing and opening of the chamber, with or without cooling, is unacceptable, since the excess xenon would then simply escape into the environment, which is the very thing which one is seeking to avoid. Consequently, following the cooling of chamber 2, the chamber is evacuated by withdrawal of the xenon gas through line 4 by non-contaminating vacuum pump 6. The gas passes through a diaphragm valve 8 into line 10 where its pressure is monitored by sensor 12 which in turn controls the operation of vacuum pump 6. The xenon gas is exhausted from vacuum pump 6 into surge tank 14 through line 16. In the embodiment shown in FIG. 1, the xenon gas is to be compressed prior to storage to minimize the size of the storage tank 30. The xenon gas from the surge tank 14 is pumped through line 18 by non-contaminating compressor 20 and passed through check valve 22 and lines 24 and 26 and valve 28 into non-contaminating storage tank 30. Valve 28 is open and valve 38 is closed, so that the xenon will all be directed into the tank 30, following which valve 28 is also closed, to seal tank 30 against escape of the xenon. Compressor 20 serves to compress the gas to reduce the size of tank 30. Tank 30, in consequence, is built to withstand the high pressure of the compressed gas. The gas is not condensed and liquified, since that would require a cooling facility which is not necessary to the performance of the present invention. In addition, providing capability within the process for evaporation and expansion of the liquified gases would introduce an undesirable degree of complexity into the system and also introduce additional equipment in which contamination of the gas could occur.

Once the chamber 2 has been evacuated to a very low residual quantity of the xenon gas (preferably no more than 5%, and more preferably no more than 1%, of the xenon remaining in the chamber) and the gas has been passed to storage tank 30 (or at least past check valve 22) to prevent backflow, the vacuum in the chamber is eliminated by filling the chamber with a "purging" gas which is inert to the chamber components and the product. Typically, such a gas will be nitrogen or argon, introduced through line 32. Once the pressure within the chamber 2 becomes equilibrated with the ambient purge gas pressure, the chamber 2 can be opened and the products (in this example the sealed light bulbs) recovered from the interior of the chamber. At this time clean up, maintenance or refurbishing of the chamber as may be needed may be done. Once the chamber is emptied of the previous batch of light bulbs, and any maintenance, etc., is completed, it is refilled with the next batch of assembled light bulbs and is ready to be sealed and to have the xenon gas reintroduced. During purging, emptying, and refilling, it is desirable to maintain the purge gas 1i flow at a high enough rate to maintain a net positive pressure within the chamber 2, to inhibit the inflow of any air or other ambient gas, vapor or dust; this will be aided if the chamber 2 is loaded and emptied through protective locks. Once the chamber is again sealed, the nitrogen, argon or other purging gas which has been introduced through line 32 is evacuated from the interior of chamber 2 through line 34, using conventional vacuum pump equipment. Since the purging gas will not be recycled to the manufacturing step (and usually is merely vented and not recycled at all), that vacuum pump equipment need not be non-contaminating. The chamber 2 is evacuated to the point where the partial pressure of the purging gas is at a level previously determined to be sufficiently low that any residual concentration of the purging gas remaining in the chamber after the chamber is filled with the xenon gas will not have any adverse effect upon the manufacturing or reaction operation.

It will be recognized by those skilled in the art that there are many commercial vacuum pumps which are capable of evacuating chamber 2 to the point where the amount of residual purging gas is negligible. The exact final concentration of purging gas which is acceptable will be determined on a process-by-process basis, and such determinations will be readily made by the process operator. Typically the purging gas content will be lowered to below 5 torr and preferably to below 10 mtorr.

When the evacuation of the purging gas through line 34 is complete, the reintroduction of the xenon gas from storage tank 30 can begin. Again referring to the embodiment of the current system shown in FIG. 1, valve 28, which had previously been closed to isolate tank 30, is now opened as is valve 38, and the xenon gas (under pressure from its compression) flows out of vessel 30 through valve 28, line 26 and valve 38 into line 40. While a small portion of the gas will be diverted into line 24, the presence of check valve 22 will prevent any xenon loss by backflow through that line.

Make-up xenon is introduced into the system through inlet line 44 which feeds through valve 46 into line 40. The make up xenon gas will replace that quantity of xenon which was used in chamber 2 during the previous manufacturing step to fill the glass envelopes of the light bulbs. Usually there is also a slight excess of xenon gas added through line 44 to make up for any leakage which may occur throughout the system during operation. The amount of system loss will vary for different gases, but those skilled in the art will be well aware of the properties of the various gases of interest. System losses are likely to be the greatest when the gas in the system is or includes helium, since it is known that it is difficult to seal all joints and connections of a helium transport system sufficiently tightly to prevent escape of some helium. The propensity to leak from a gas transport system is less with most other gases, particularly those which are in the form of more complex molecules, such as some of the halocarbon gases.

Both the initial xenon and the make up xenon pass through line 40 to purifying system 42. The purpose of purifying system 42 is to remove any contaminating moisture, undesirable gas or particulate material which has gotten into the xenon gas as it passed through the various components of the system. Commonly gases which are considered undesirable "atmospheric contaminants" include nitrogen, argon, oxygen, carbon monoxide, carbon dioxide and water vapor. Because of the clean nature of the equipment throughout the system, the amount of contaminants to be removed in purifying system 42 is usually quite low with respect to the gas which has previously been in the system and is being recycled. Further, since the new make up gas being added through line 44 also passes through purifying unit 42, the purifying unit can act to remove any solid or gaseous contaminants or moisture which may have entered the make up gas while it was being added to the present system or with which may have contaminated during its prior residence in cylinders, tanks or other storage facilities outside the current system.

In addition, purifying system 42 can be used to remove dopants or other gaseous materials deliberately added to the system but which it is not desirable to return to the chamber 2. For instance, the xenon or other gas used in the chamber 2 in the reaction or manufacturing process may be doped with a radioactive isotope or, in the case of light bulb manufacturing, a light altering component such as methyl bromide. Usually some of the dopant is consumed or sequestered during the operation in chamber 2, so that the exiting xenon has a lower concentration of the dopant than was present in the introduced xenon. In most cases it is impractical or difficult to re-dope the withdrawn xenon to raise the dopant level back up to the concentration required during the operation in chamber 2, especially since this introduces an additional point at which contamination can enter the system. Therefore, the preferred practice is to remove the residual dopant from the withdrawn xenon in purifying system 42, so that pure xenon exits from purifying system 42. A fresh quantity of dopant, in a xenon carrier if necessary, can then be added to the chamber 2 through line 72, to mix with the xenon to form the correct concentration for the process.

From system 42 the total quantity of gas (recycled plus make up) is passed through line 48 and valve 50 and on through pressure controlled valve 52 and line 54 back into chamber 2. The gas flow is continued until the chamber has come up to the desired operating pressure, at which time valves 28, 38, 46 and 50 are all closed (valve 8 having previously been closed to avoid escape of gas from chamber 2) and the manufacturing process or chemical reaction process within chamber 2 can be initiated. Once that operaton has been completed, the cycle described above will be repeated.

Figure 2:
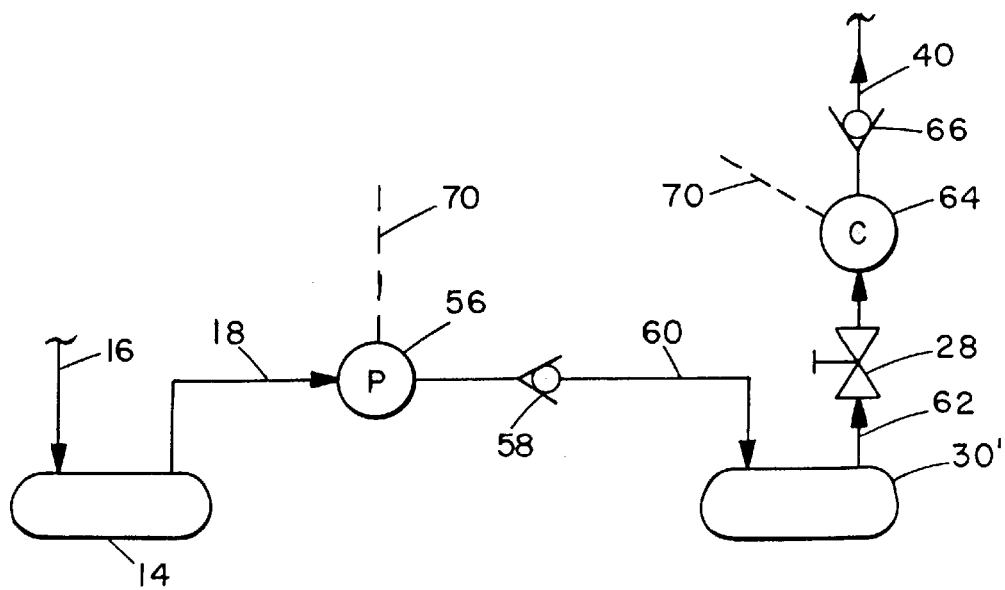
FIG. 2 is a partial schematic flow diagram illustrating a modified embodiment of one portion of the method.

An alternative form of the invention is illustrated in FIG. 2 in which the gas is transferred to storage vessel 30' in an uncompressed state and then compressed as it is being drawn from vessel 30' to be sent back to the chamber 2. In this version, the xenon gas coming from vacuum pump 6 through line 16 passes through the surge tank 14 and then into line 18. In this embodiment line 18 leads to non-contaminating transfer pump 56 which serves to move the gas from surge tank 14 through check valve 58 and through line 60 to storage vessel 30' with little or no compression. Valve 28 is closed to prevent escape of the gas from vessel 30'. When it is time to recycle the gas back to chamber 2, valve 28 is opened and the xenon is drawn from vessel 30' through line 62 and valve 28 by compressor 64, which compresses the gas (usually to same pressure as gas in line 40 of the first embodiment had) and passes it on through check valve 66 into line 40. From there the gas is merged with make up gas from line 44 and returns to the chamber 2 as described above. In this second embodiment, of course, vessel 30' must have a higher available volume than tank 30, but need not be as strong since it holds the xenon at a lower pressure. Commonly inflatable bags are used as such storage vessels; typically these have multilayer walls to prevent loss of the xenon and infiltration of atmospheric contaminants.

Considering now other embodiments and various alternatives, the process gas in the present invention (xenon in the example) may actually be any of a wide variety of gases which, for one reason or another, cannot or should not be vented to the ambient environment and for which it is desirable to recycle the gases for subsequent use in the manufacturing or chemical reaction processes. These will include, but are not limited to, the group VIII gases (helium, neon, argon, krypton, xenon and radon), carbon oxide gases such as CO and $CO_2$, the halocarbon gases such as the fluorocarbons and the chlorofluorocarbons including the various Freon™ refrigerants, radioactive gases including both the naturally radioactive gases such as radon and tritium and also any normally nonradioactive gases which have been either made radioactive by irradiation in a nuclear reactor or by another radioactivity source, or radioactive gases which are the daughter products of other radioactive materials. Among the Group Vlll gases the preferred ones for application of this process are helium, neon, krypton and xenon. Argon, being a substantial component of air (about 1%) is a very abundant gas and it will usually be found that the cost of recovering argon is not Justified. Further, as a normal component of the ambient atmosphere, venting argon to the atmosphere causes neither environmental problems nor ultimate loss of the argon, since replacement argon can be readily separated from air by conventional gas separation processes at relatively low cost. Similarly, radon is more appropriately dealt with as a radioactive gas rather than as a Group Vlll gas, since the problems associated with radon gas are more parallel to those associated with other radioactive gases, as compared to dealing with the non-radioactive Group Vlll gases.

Another important class of gases to be recovered and recycled in the present process (which to some extent overlaps with the previous various gas categories) includes those which are environmentally hazardous, regardless of the nature of the hazard. The hazardous gases include those which are hazardous to the health of humans and animals who may come into contact with the gas as well as gases which pose an environmental hazard by being capable of contaminating the ambient air, water, soil, vegetation, facilities and so forth. Environmentally hazardous gases will also include those which may be corrosive to metal structures and other fabricated products. In addition, hazardous gases may include those which are precursors of acids, such as sulphur oxides, nitrogen oxides and hydrogen halides, all of which, in the presence of or by reaction with atmospheric moisture, will form acidic compounds colloquially known as "acid rain". Those skilled in the art will be aware of these and other gases which because of their valuable and/or hazardous nature will also be advantageously recovered and reused by the present process.

As has been noted above, a principal element in the present invention is the requirement that all equipment in the system, including piping, valves, pumps and compressors, be non-contaminating. By this is meant that they must not require for their operation the presence of any contaminating material which can come into contact with the process gas stream. Most commonly, this "contaminating material" will be a lubricant, sealant or other material which contains a volatile component, the most common of which is one or more of the hydrocarbon compounds. All hydrocarbon oils and greases are volatile to a greater or lesser degree, and each has a significant partial pressure when used under the operating conditions typical of gas compressors and vacuum pumps. Consequently, it is required in the present process that the equipment be such that no lubricant or other solid, liquid or gaseous contaminating material be used in the equipment in any capacity in which it can contact the gas stream. There are a number of suitable vacuum pumps and compressors commercially available on the market, including those known as diaphragm compressors, dry vacuum pumps and oil-free compressors; many suitable ones are made by companies such as Air Dimensions, Inc.; Galiso/Nuvac, Inc.; Danielson Associates; Varian; Haskel, Inc.; Senior Flexonics, Inc. and Thomas Industries.

The purifying system preferably used in the present invention will be one which effectively removes moisture, contaminant gases and particulate contaminates from the gas stream without adding any contamination of its own to the gas stream. A particularly preferred purification system is one manufactured by the assignee of the present invention, Aeronex, Inc. The particular version of the Aeronex purifying system will depend upon the properties of the gas which is being recovered and reused; typical properties of significance include corrosiveness, reactivity, molecular weight and whether or not the gas is radioactive. Contaminants are removed to at least the 1 ppm level, and commonly removal to a "low ppb" level such as 10 ppb or less, preferably 1 ppb or less, can be achieved.

It may also be advantageous to include scrubbers and the like to separate "foreign" gaseous contaminants, such as having a xenon gas flow pass through a heated titanium sponge or metal getter to remove any contaminant nitrogen in the gas. In this regard, there will, as noted above, be some small concentration of the purge gas mixed into the process gas each time the chamber 2 is emptied of the process gas and pressurized and purged to remove the products, and then refilled with the process gas. In order to avoid extensive build up of purge gas concentration in the process gas flow stream, use of some sort of purge gas scrubber (which can be incorporated into the purifying unit 42) will be advantageous. All of the purifiers, scrubbers, and the like must also be non-contaminating as defined herein, to avoid problems of long-term contaminant build up.

Suitable purifiers, scrubbers and the like are described in the commercial literature. In addition, there are numerous patents which describe all of the devices or important features thereof.

As with the purifiers, pumps, compressors, etc., the various valves and lines in the system will be fabricated from materials which are selected with regard to the properties of the gas being transported. As above, such properties as corrosiveness and leak potential will be important in the selection of the valve and conduit materials. Typically, the conduits and valves will be formed of stainless steel (such as Type 316L) or another resistant alloy and will be all welded; the fittings will commonly be high integrity compression or face seal fittings. The gas flow rate must also be taken into consideration in selecting materials which may be subject to high gas flow rates and therefore strong erosion forces.

It will also be seen that the present invention is well suited to being fully or partially automated. A computer 68 and the appropriate software may be used to control the opening and closing of various valves such as 28 and 38, operation of the compressors 20 or 64 and pumps 6 and 56, as well as the opening, closing and purging of chamber 2, all as graphically indicated by the dotted lines 70 in FIG. 1. Other equivalent connections not shown can operate other valves in the system as well as making determinations such as the quantity of gas present in vessels 14 and 30 or 30'. Thus, for instance, the end of one manufacturing process cycle in chamber 2 can be determined by an appropriate sensor which will send a signal to the computer system 68. Suitable software will then start a sequence in which the various valves, pumps and compressors are opened and closed in the proper sequence and started and stopped at appropriate intervals, so that filling and purging of the chamber 2 can be accomplished. The chamber 2 is then automatically unlocked so that finished product can be recovered. Once the next batch of product precursors have been loaded and the chamber again sealed, the computer system can control purge gas withdrawal and process gas injection. Such control and operating functions are all well within the capabilities of commercially available computer systems and software. The operator of the present system can therefore select systems and software to automate as much or as little as desired of the system.

It will be evident that there are numerous embodiments of the present invention which, while not expressly described above, are clearly within the scope and spirit of the invention. The above description is therefore intended to be exemplary only, and the scope of the invention is to be limited solely by the appended claims.

We claim:

1. A method for the recovery of process gas from a chamber after a first operation in said chamber involving presence or use of said gas, and recirculation of said gas to said chamber for use in a subsequent operation involving presence or use of said gas, which comprises:
   a. withdrawing substantially all of said process gas from said chamber through a non-contaminating vacuum pump following completion of said first operation;
   b. passing said process gas to a storage vessel prior to or following compression of said process gas through a non-contaminating compressor;
   c. relieving a vacuum created in said chamber by withdrawal of said process gas by insertion of a purge gas into said chamber, such that access may be had to said chamber;
   d. evacuating said chamber by withdrawal of said purge gas;
   e. recovering said process gas from said storage vessel and if uncompressed, compressing said process gas; and
   f. returning said compressed process gas to said evacuated chamber; such that said returned process gas may be reused therein in said subsequent operation.

2. A method as in claim 1 wherein said process gas is compressed prior to passage of said process gas to said storage vessel.

3. A method as in claim 1 wherein said process gas is compressed following recovery of said process gas from said storage vessel.

4. A method as in claim 1 wherein said process gas comprises a Group Vlll gas.

5. A method as in claim 4 wherein said Group Vlll gas is helium, neon, krypton or xenon.

6. A method as in claim 1 wherein said process gas comprises a hazard to the ambient environment or beings therein.

7. A method as in claim 6 wherein said process gas comprises a carbon oxide gas, a halocarbon gas, an acid-precursor gas, a biologically hazardous gas, or a radioactive gas.

8. A method as in claim 1 wherein during step a. at least 95% of all process gas is withdrawn from said chamber.

9. A method as in claim 1 wherein during step a. at least 99% of all process gas is withdrawn from said chamber.

10. A method as in claim 1 wherein said process gas is passed through a purifier prior to return to said chamber for reuse, whereby moisture, contaminating gas or particulate material present in said process gas may be removed.

11. A method as in claim 1 wherein said process gas contains a dopant and a portion of said dopant is consumed, reacted or sequestered during said first operation, such that the concentration of said dopant in said process gas withdrawn from said chamber in step a. is less than the concentration of said dopant in said gas at the start of said first operation, said method further comprising removing residual dopant from said process gas after said gas exits said chamber, such that process gas returned to said chamber in step f. is substantially free of said dopant.

12. A method as in claim 11 wherein said dopant comprises a radioisotope or a light affecting compound.

13. A method as in claim 1 wherein said non-contaminating vacuum pump and compressor utilize no hydrocarbon lubricants or components.

14. A method as in claim 1 wherein said non-contaminating vacuum pump and compressor place no volatile or transferable gas, liquid or particulate matter in contact with said process gas.

15. A method as in claim 1 wherein said purge gas comprises nitrogen or argon.

16. A method as in claim 1 wherein step f. further comprises subjecting said compressed process gas to purification whereby any contaminant which has become mixed with said process gas in any of steps a.–e. is removed.

17. A method as in claim 16 wherein said contaminant comprises moisture, another gas or solid particulated material.

18. A method as in claim 1 wherein operation of at least one of steps a.–f. is controlled by a computer.

* * * * *